US010983414B2

(12) United States Patent
Byon et al.

(10) Patent No.: US 10,983,414 B2
(45) Date of Patent: Apr. 20, 2021

(54) CAMERA MODULE INCLUDING MAGNET FIXING POSITION OF LENS USING MAGNETIC FORCE AND ELECTRONIC DEVICE FOR THE SAME

(71) Applicant: Samsung Electronics Co., Ltd, Suwon-si (KR)

(72) Inventors: Kwang Seok Byon, Yongin-si (KR); Jae Mu Yun, Hwaseong-si (KR); Young Jae Hwang, Suwon-si (KR); Jin Won Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 16/147,359

(22) Filed: Sep. 28, 2018

(65) Prior Publication Data

US 2019/0101808 A1 Apr. 4, 2019

(30) Foreign Application Priority Data

Sep. 29, 2017 (KR) ........................ 10-2017-0126983

(51) Int. Cl.
*G03B 5/02* (2021.01)
*G03B 13/36* (2021.01)
(Continued)

(52) U.S. Cl.
CPC ............. *G03B 5/02* (2013.01); *G02B 13/009* (2013.01); *G02B 27/646* (2013.01); *G03B 3/10* (2013.01);
(Continued)

(58) Field of Classification Search
CPC . G03B 5/02; G03B 3/10; G03B 17/17; G03B 5/00; G03B 13/36; G03B 2217/005;
(Continued)

(56) References Cited

U.S. PATENT DOCUMENTS 7,630,151 B2 12/2009 Fujita et al.
8,149,284 B2 4/2012 Hasegawa et al.
(Continued)

FOREIGN PATENT DOCUMENTS

KR 10-2013-0047659 A 5/2013

OTHER PUBLICATIONS

European Patent Office, "European Search Report," Application No. EP18197729.9, dated Jan. 30, 2019, 6 pages.

*Primary Examiner* — Tuyen Tra

(57) ABSTRACT

A camera module includes a lens unit including one or more lenses, wherein at least some of the one or more lenses are movable along a path corresponding to optical axes of the one or more lenses, and a driving unit to move the at least some lenses along the path. The driving unit includes a magnet physically connected with the at least some lenses, a coil to form a magnetic field such that the magnet moves along the path, and a magnetic substance disposed on one surface of the coil opposite to another surface of the coil, which is adjacent to the magnet. The magnetic substance adapts the at least some lenses, which are physically connected with the magnet, to a specified position of the path by using magnetic force between the magnet and the magnetic substance, which is formed as the coil approaches the magnet.

20 Claims, 17 Drawing Sheets

(51) Int. Cl.
*H02K 11/21* (2016.01)
*H02K 41/035* (2006.01)
*G02B 13/00* (2006.01)
*H04N 5/225* (2006.01)
*H04N 5/232* (2006.01)
*G03B 3/10* (2021.01)
*G03B 17/17* (2021.01)
*G02B 27/64* (2006.01)
*G03B 5/00* (2021.01)

(52) U.S. Cl.
CPC ............... *G03B 5/00* (2013.01); *G03B 13/36* (2013.01); *G03B 17/17* (2013.01); *H02K 11/21* (2016.01); *H02K 41/0356* (2013.01); *H04N 5/2257* (2013.01); *H04N 5/2328* (2013.01); *H04N 5/23258* (2013.01); *H04N 5/23287* (2013.01); *G03B 2205/0046* (2013.01); *G03B 2205/0069* (2013.01); *G03B 2217/005* (2013.01)

(58) Field of Classification Search
CPC .... G03B 2205/0069; G03B 2205/0046; G02B 13/009; G02B 27/646; G02B 7/09; G02B 7/102; H04N 5/2257; H04N 5/23287; H04N 5/23258; H04N 5/2328; H02K 11/21; H02K 41/0356; H02K 41/0354
USPC .................. 359/642, 811, 819, 822, 823, 824
See application file for complete search history.

(56) References Cited

U.S. PATENT DOCUMENTS

| | | | |
|---|---|---|---|
| 8,792,166 | B2 | 7/2014 | Watanabe et al. |
| 9,204,049 | B2 | 12/2015 | Nomura et al. |
| 10,216,001 | B2 | 2/2019 | Sueoka |
| 2001/0048475 | A1* | 12/2001 | Shiomi .............. H04N 5/23258 348/208.99 |
| 2008/0285162 | A1 | 11/2008 | Fujita et al. |
| 2011/0267692 | A1 | 11/2011 | Watanabe et al. |
| 2017/0176765 | A1 | 6/2017 | Sueoka |
| 2018/0321460 | A1* | 11/2018 | Lee ............................ G02B 7/09 |
| 2019/0072744 | A1* | 3/2019 | Hu ............................ G02B 7/09 |

* cited by examiner

CAMERA MODULE INCLUDING MAGNET FIXING POSITION OF LENS USING MAGNETIC FORCE AND ELECTRONIC DEVICE FOR THE SAME

CROSS-REFERENCE TO RELATED APPLICATION AND CLAIM OF PRIORITY

This application is based on and claims priority under 35 U.S.C. § 119 to Korean Patent Application No. 10-2017-0126983 filed on Sep. 29, 2017, in the Korean Intellectual Property Office, the disclosure of which is incorporated by reference herein its entirety.

BACKGROUND

1. Field

The present disclosure relates to a camera module including a driving unit.

2. Description of Related Art

Recently, various types of electronic devices, such as a smartphone and a tablet personal computer (PC), have achieved widespread adoption as a result of developments in information technology.

Certain electronic devices include camera modules. The camera module may be implemented in compact size to be embedded in the electronic device and may have various functions. For example, the camera module may have a zoom function to enlarge or reduce an image of a captured target at various magnifications.

To support the above function, the camera module needs to have a driving unit to move a lens included in the camera module to a specified position and to adapt the lens to the specified position. A voice coil motor (VCM) employing a magnetic field produced by current flowing in the coil may be used as the driving unit.

The lens may move with a specific path along a guide shaft passing through a portion of the lens. A gap having a specific size is necessary between the lens and the guide shaft such that the lens smoothly moves.

The above information is presented as background information only to assist with an understanding of the present disclosure. No determination has been made, and no assertion is made, as to whether any of the above might be applicable as prior art with regard to the present disclosure.

SUMMARY

To ensure an exact magnification and obtain a clear image, a lens has to be moved to and then exactly adapted to a specified position. However, the gap, which is present between the lens and the guide shaft to smoothly move the lens, may make the lens tilted without exactly adapting the lens to the specified position. When the lens is tilted as described above, an optical axis of the lens may be offset and thus the camera module may obtain an image which is distorted or otherwise unclear.

Additionally, while the lens can be exactly adapted to the specified position by continuously applying a current to a coil included in the driving unit, continuous application of a current can produce a steady increase current consumption.

Certain embodiments according to the present disclosure address at least the above-mentioned problems and/or disadvantages and provide at least the advantages described below. Accordingly, some embodiments according to the present disclosure provide a camera module.

In accordance with some embodiments of the present disclosure, a camera module may include a lens unit including one or more lenses, wherein at least some of the one or more lenses are movable along a path corresponding to optical axes of the one or more lenses, and a driving unit to move the at least some lenses along the path. The driving unit may include a magnet physically connected with the at least some lenses, a coil to form a magnetic field such that the magnet moves along the path, and a magnetic substance disposed on one surface of the coil opposite to another surface of the coil, which is adjacent to the magnet. The magnetic substance may adapt the at least some lenses, which are physically connected with the magnet, to a specified position of the path by using magnetic force between the magnet and the magnetic substance, which is formed as the coil approaches the magnet.

In accordance with various embodiments according to the present disclosure, a camera module may include a first coil, a second coil disposed to be spaced from the first coil by a first distance, a magnet movable along a specified path having the first distance by a magnetic field produced by the first coil or the second coil, a lens module coupled to the magnet to move together with the magnet, and at least one magnetic substance disposed at outer portions of the first coil and the second coil to bring the magnet into close contact with the first coil or the second coil when the lens module arrives at a specified position.

In accordance with at least one embodiment according to the present disclosure, an electronic device may include a camera module including a first coil, a second coil spaced apart from the first coil by a first distance, a magnet movable along a specified path having the first distance by a magnetic field produced by the first coil or the second coil, a lens module coupled to the magnet to move together with the magnet, and at least one magnetic substance disposed at outer portions of the first coil and the second coil to bring the magnet into close contact with the first coil or the second coil when the lens module arrives at a specified position, and a control circuit to adjust an intensity of a current flowing through the first coil or the second coil.

According to certain embodiments disclosed in the present disclosure, the mobility of the lens in the camera module may be ensured and the lens may be exactly adapted to a specified position. Accordingly, a user may obtain an undistorted and clear image by using the camera module.

According to various embodiments disclosed in the present disclosure, since a current to be consumed in the camera module may be saved, the available time of the camera module and the available time of the electronic device including the camera module may be increased. Besides, a variety of effects directly or indirectly understood through the present disclosure may be provided.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

In the following description made with respect to the accompanying drawings, similar components will be assigned with similar reference numerals.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
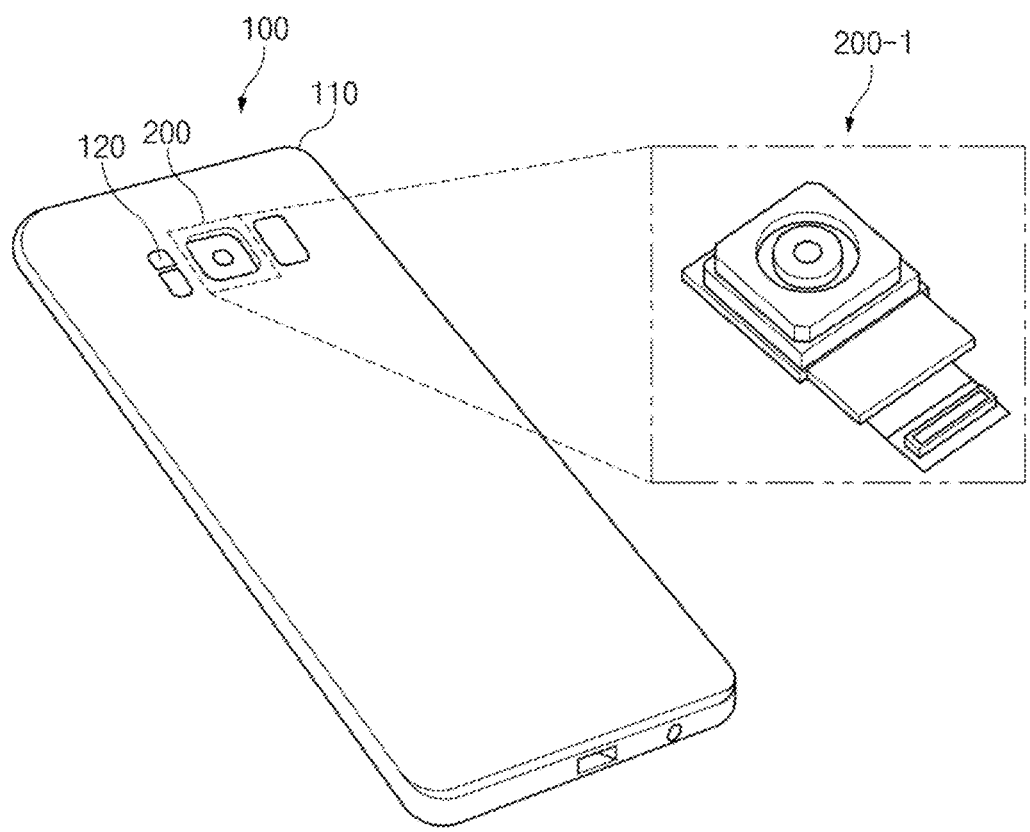
FIG. 1 illustrates a camera module and an electronic device including the camera module, according to various embodiments.

FIG. 1 illustrates a camera module and an electronic device, according to various embodiments.

Referring to the non-limiting example of FIG. 1, an electronic device 100 may have a rear cover 110, a flash 120, and/or a camera module 200 provided on the rear surface of the electronic device 100. According to various embodiments, some of the components may be omitted or a component, which is not illustrated, may be additionally provided. For example, a fingerprint sensor may be disposed on the rear surface of the electronic device 100. For another example, an additional camera different from the camera module 200 may be further disposed on the rear surface of the electronic device 100.

The rear cover 110 may be coupled to the rear surface of the electronic device 100. The rear cover 110 may be formed of tempered glass, a plastic-injection molded product, and/or metal. According to certain embodiments, the rear cover 110 may include at least one opening, and the fingerprint sensor, the flash 120, and/or the camera module 200 may be exposed through the opening.

As the flash 120 emits light, the flash 120 may assist the capturing of the camera module 200. According to some embodiments, the flash 120 may emit light automatically or by the handling of a user, when illuminance outside the electronic device 100 is equal to or lower than a specific level. According to various embodiments, the flash 120 may be configured as a part of the camera module 200.

The camera module 200 may be optical equipment to take a picture or a moving picture of a subject. According to various embodiments, a portion of the camera module 200 may be exposed to the outside through the opening included in the rear cover 110. When viewed from the enlarged view of the camera module 200 separated from the electronic device 100, the camera module 200 may be the same as or similar to a camera module 200-1.

According to certain embodiments, the camera module 200 may be disposed on a front surface part of the electronic device 100. According to some embodiments, an additional camera module may be additionally disposed on a rear surface part of the electronic device 100. In this case, the electronic device 100 may capture different parts and may combine images of the captured parts to make one image.

According to various embodiments, the camera module 200 may have various functions. For example, the camera module 200 may have an auto-focus function. The auto-focus function may refer to a function of allowing the camera module 200 to adjust the position of at least one lens and thus to automatically focus on a subject. For another example, the camera module 200 may have an optical image stabilization (OIS) function. The optical image stabilization (OIS) function may refer to a function of correcting the shift of an image caused by the handling of the user. For another example, the camera module 200 may have a zoom-in function or a zoom-out function. The camera module 200 may adjust the size of the image by adjusting the position of at least one lens.

The following description of the present disclosure will be made regarding the camera module 200 that is included in the electronic device 100.

Figure 2A:
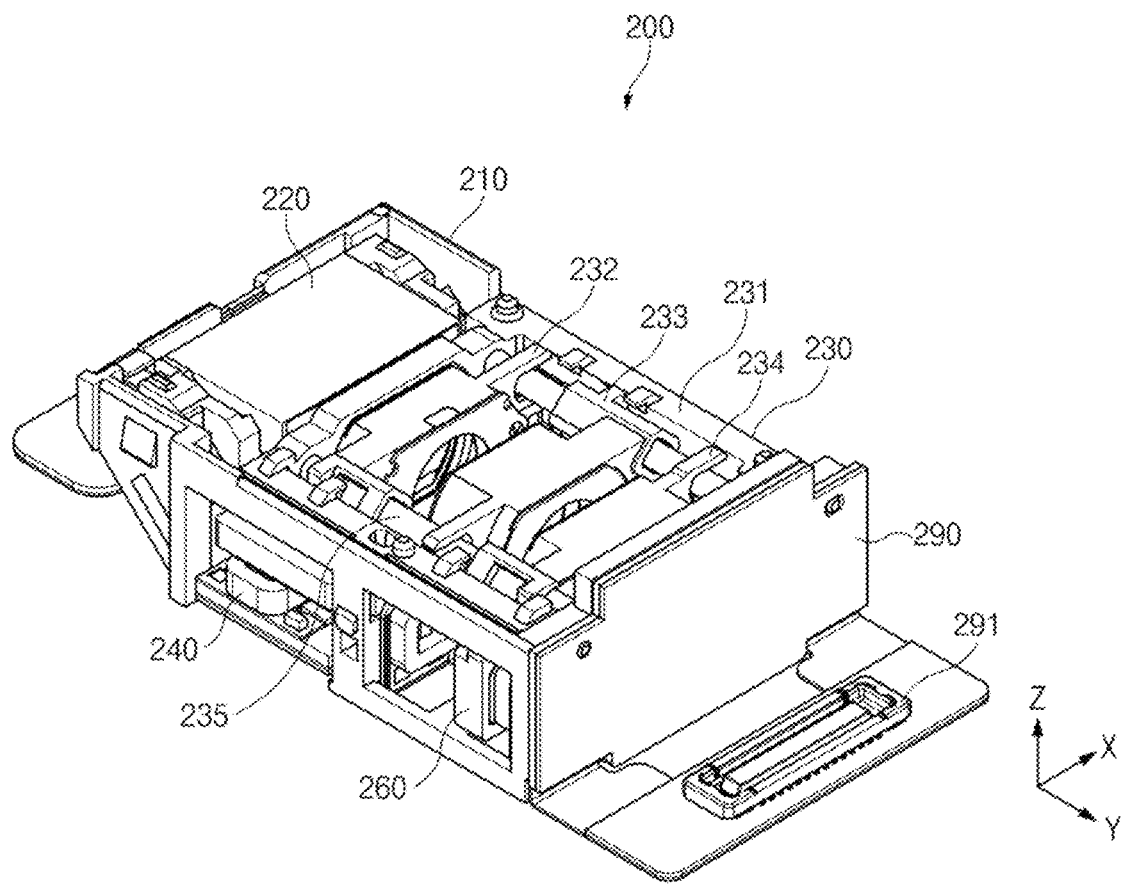
FIG. 2A illustrates a camera module, according to certain embodiments.

FIG. 2A illustrates a perspective view of a camera module when viewed in one direction, according to certain embodiments.

Figure 2B:
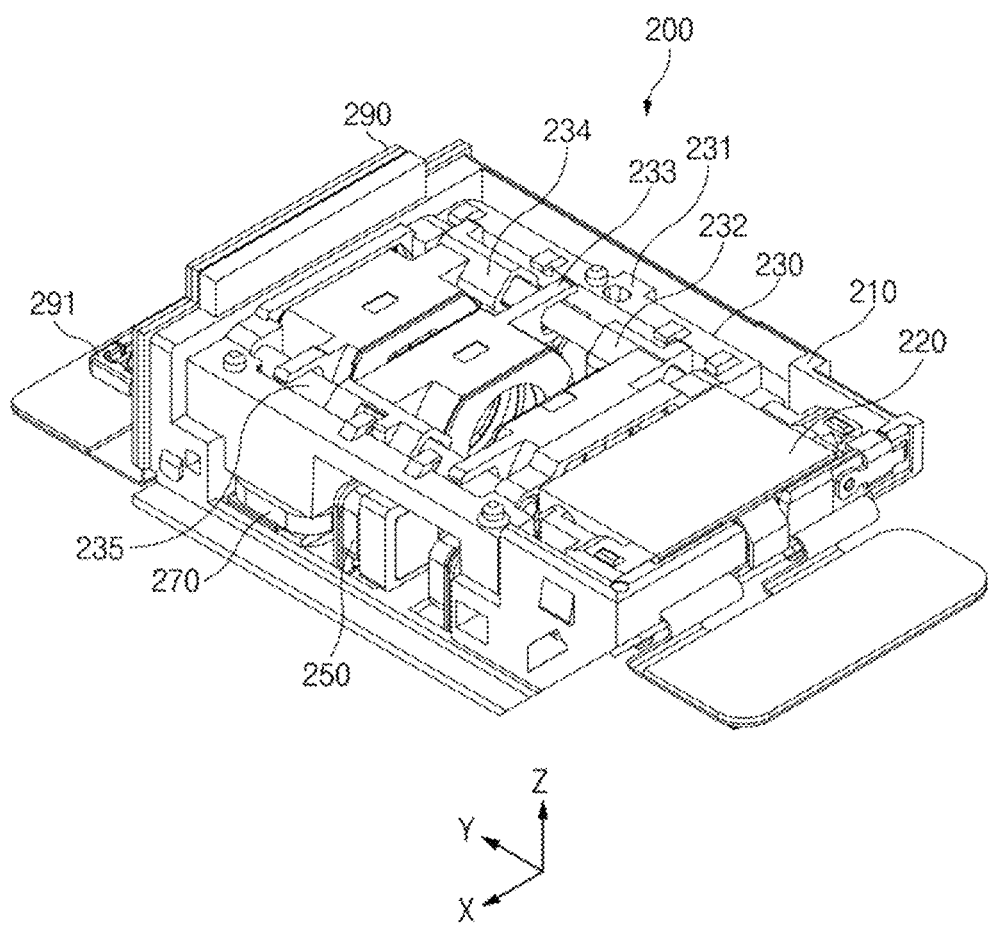
FIG. 2B illustrates a perspective view of a camera module when viewed in another direction, according to some embodiments.

FIG. 2B illustrates a perspective view of a camera module when viewed in another direction, according to some embodiments.

Figure 2C:
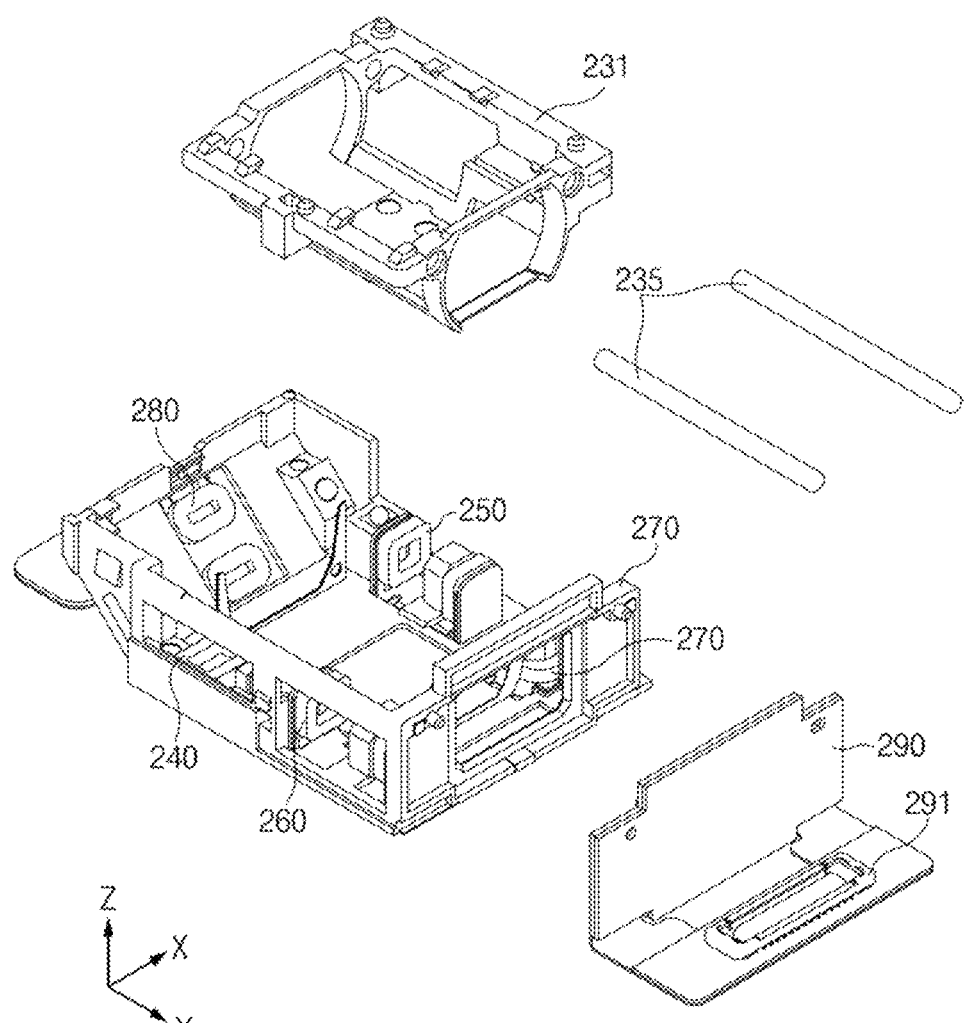
FIG. 2C illustrates an exploded perspective view of a camera module, according to various embodiments.

FIG. 2C illustrates an exploded perspective view of a camera module, according to various embodiments.

Referring to the non-limiting example shown through FIGS. 2A, 2B, and 2C, the camera module 200 may include a housing 210, a reflective member 220, a lens unit 230, a first driving unit 240, a second driving unit 250, a third driving unit 260, a fourth driving unit 270, a fifth driving unit 280, an image sensor 290, and a connector 291. According to various embodiments, the camera module 200 may be implemented without some components or may be implemented with an additional component which is not illustrated in drawings. For example, the camera module 200 may not include some of the driving units 240, 250, 260, 270, and 280 depending on the number of lenses included in the lens unit 230. For another example, the camera module 200 may further include a cover surrounding the housing 210. For another example, the camera module 200 may further include a control circuit (not illustrated), a sensor (not illustrated) sensing the position of the lens module, a vibration sensor (not illustrated), or an acceleration sensor (not illustrated).

The housing 210 may receive components of the camera module 200 and may protect the components from an external impulse. According to certain embodiments, the housing 210 may include tempered glass, a plastic-injection molded product, and/or a non-magnetic member.

According to some embodiments, the housing 210 may include a plurality of surfaces. For example, the housing 210 may have the shape of hexahedron. For another example, as illustrated in FIG. 2, the housing 210 may have the shape of hexahedron which is inclined in at least one side thereof.

According to various embodiments, the housing 210 may have an opening formed in one surface of the housing 210. The camera module 200 may receive light from an external subject through the opening. According to certain embodiments, the connector 291 may be attached to one surface of the housing 210. The camera module 200 may be electrically connected with a processor of the electronic device 100 by using the connector 291.

The reflective member 220 may reflect or refract light, which is received from the external subject, in a direction (for example, the Y axis) of the lens unit 230. According to some embodiments, the direction of the light heading to the lens unit 230 through the reflective member 220 may be referred to as an optical axis direction.

According to various embodiments, the reflective member 220 may be rotated about an X axis direction on a Y-Z plane by at least one driving unit 280. When the reflective member 220 is rotated about the X axis direction on the Y-Z plane, the direction of light passing through the reflective member 220 may be changed depending on an angle at which the reflective member 220 is rotated. According to certain embodiments, when the hand of a user is shaken in a Z axis direction, the camera module 200 may correct the image by rotating the reflective member 220 in an opposition direction.

The lens unit 230 may be disposed inside the housing 210 and may include a lens holder 231, a first lens 232, a second lens 233, a third lens 234, and a shaft 235. According to various embodiments, the lens unit 230 may be implemented without some components or may be implemented with an additional component which is not illustrated in drawings. For example, at least one of the first lens 232, the second lens 233, and/or the third lens 234 may be omitted.

According to some embodiments, the lens holder 231 may receive one or more lenses 232, 233, and/or 234 included in the lens unit 230. According to various embodiments, the lens holder 231 may be coupled with the one or more lenses 232, 233, and/or 234 through the shaft 235.

According to certain embodiments, the lens holder 231 may be moved in an X axis direction by at least one driving unit 270. The X axis direction may be understood as a direction perpendicular to the optical axis direction. The one or more lenses 232, 233, and 234 received in the lens holder 231 may be moved together with the lens holder 231 in the same direction. According to some embodiments, when the hand of a user is shaken in the X axis direction, the camera module 200 may correct the image by moving the lens holder 231 in an opposition direction.

According to various embodiments, the first lens 232, the second lens 233, and the third lens 234 may adjust the path of light incident thereto in the optical axis direction such that the light converges on one focal point or diverges from one focal point. The camera module 200 may change the size of an image or the focal point of the image by adjusting the distance between the first lens 232 and the second lens 233 and the distance between the second lens 233 and the third lens 234. According to certain embodiments, the first lens 232, the second lens 233, and the third lens 234 may be referred to as a lens module.

According to some embodiments, each of the first lens 232, the second lens 233, and the third lens 234 may be provided in the form of a one-group lens made by combining multiple single lenses with each other. For example, the first lens 232 may be provided in the form of a one-group lens made by combining three single lenses with each other. According to various embodiments, the first lens 232 may be referred to a first-group lens, the second lens 233 may be referred to as a second-group lens, and the third lens 234 may be referred to as a third-group lens.

According to various embodiments, the first lens 232, the second lens 233, and the third lens 234 may be moved along a specified path by the first driving unit 240, the second driving unit 250, and the third driving unit 260 coupled to the first lens 232, the second lens 233, and the third lens 234, respectively. According to certain embodiments, the specified path may be a Y-axis direction. The Y axis direction may be understood as a direction parallel to the optical axis direction. According to some embodiments, the specified path may be determined by the shaft 235. Each lens may be coupled to the shaft 235 and may be moved in a forward or backward direction along the shaft 235. The forward direction may be understood as a direction that each lens becomes closer to the reflective member 220, and the backward direction may be understood as a direction that each lens becomes away from the reflective member 220.

According to various embodiments, the first lens 232 may be a lens for performing an auto-focus function. The camera module 200 may measure the distance to the subject using infrared light and may adjust the position of the first lens 232 based on the measured distance. For example, when the measurement result represents that the first lens 232 is positioned too rearward to focus on the subject, the camera module 200 may move the first lens 232 forward through the first driving unit 240.

According to certain embodiments, the second lens 233 and the third lens 234 may be lenses for performing a zoom-in function or a zoom-out function. According to some embodiments, the camera module 200 may have discrete magnification options which are preset. For example, magnification options such as a twice magnification, a three times magnification, a five times magnification, and the like may be preset. According to various embodiments, the magnification may be varied depending on the relative positions of the second lens 233 and the third lens 234. For example, as the distance between the second lens 233 and the third lens 234 becomes longer, the whole magnification may be increased.

According to certain embodiments, the second lens 233 and the third lens 234 may be temporarily adapted to specified positions, respectively. For example, the second lens 233 may be temporarily adapted to the first position, which is the forward-most position of a specified path, and adapted to the second position which is the rearward-most position of the specified path. For example, the third lens 234 may be temporarily adapted to the third position, which is the forward-most position of a specified path, and adapted to the fourth position which is the rearward-most position of the specified path. According to some embodiments, since the magnifications of the camera module 200 may be determined depending on the relative positions of the second lens 233 and the third lens 234, the camera module 200 may have four magnification options in total.

According to various embodiments, the second lens 233 and the third lens 234 may have specified movement distances. For example, the second lens 233 may move a first distance from the first position to the second position (or from the second position to the first position). For another example, the third lens 234 may move the second distance from the third position to the fourth position (from the fourth position to the third position). According to certain embodiments, the first distance may be different from the second distance.

According to some embodiments, the shaft 235 may assemble the lens holder 231, the first lens 232, the second lens 233, and the third lens 234 with each other. For example, the lens holder 231, the first lens 232, the second lens 233, and the third lens 234 may have holes through which the shaft 235 passes. As the shaft 235 passes through the holes, the lens holder 231, the first lens 232, the second lens 233, and the third lens 234 may be assembled with each other.

According to various embodiments, the diameters of the hole, through which the shaft 235 passes, may be larger than the diameter of the shaft 235 by a specified size. When the difference between diameters of the hole and the shaft 235 is equal to or larger than the specified size, the lens holder 231, the first lens 232, the second lens 233, and the third lens 234 may smoothly move along the shaft 235.

According to certain embodiments, the shaft 235 may determine the movement path of the first lens 232, the second lens 233, and the third lens 234. The first lens 232, the second lens 233, and the third lens 234 may move forward or rearward by the driving units 240, 250, and 260, and the movement path may be guided by the shaft 235. According to some embodiments, the shaft 235 may be referred to as a guide shaft.

The first driving unit 240, the second driving unit 250, the third driving unit 260, the fourth driving unit 270, and the fifth driving unit 280 may move the first lens 232, the second lens 233, the third lens 234, the lens holder 231, and the reflective member 220 in a specified direction, respectively. According to various embodiments, some of the driving units 240, 250, 260, 270, and 280 may be omitted or driving units, which are not illustrated, may be added. According to various embodiments, at least two of the driving units 240, 250, 260, 270, and 280 may be disposed adjacent to each other on the same surface of the housing 210. For example, as illustrated in FIG. 2C, the first driving unit 240 and the third driving unit 260 may be disposed in the housing 210 while being adjacent each other. For another example, the second driving unit 250 and the fourth driving unit 270 may be disposed in the housing 210 while being adjacent to each other on the same surface.

According to certain embodiments, the driving units 240, 250, 260, 270, and 280 may move the reflective member 220, the lens holder 231, the first lens 232, the second lens 233, and the third lens 234 by using current flowing through a coil and a magnetic field produced by the current. According to some embodiments, the driving units 240, 250, 260, 270, and 280 may be voice coil motors. The voice coil motor, which serves as an actuator using Lorenz's law, may include a polarized-type coil motor and a solenoid-type voice coil motor.

According to various embodiments, the camera module 200 may further include a control circuit. The control circuit may control the intensities and the directions of currents flowing through coils included in the driving units 240, 250, 260, 270, and 280. The control circuit may control the movement of magnets included in the driving units 240, 250, 260, 270, and 280 by adjusting the intensities or the directions of the currents. According to certain embodiments, the control circuit may be included in the electronic device 100 coupled to the camera module 200.

According to some embodiments, the camera module 200 may further include a sensor sensing the position of the lens module, a vibration sensor, or an acceleration sensor. The control circuit may adjust the intensities or the directions of currents flowing through the coils, based on the sensing results of the above sensors. The details thereof will be described with reference to FIGS. 5A, 5B, 5C, and 6.

The image sensor 290 may create image data corresponding to the subject by converting light, which have passed through the lens unit 230 after reflected or emitted from the subject, into an electrical signal. The image sensor 290 may include a pixel array in which a plurality of unit pixels (or which may be referred to as sensor pixels) are arranged in a 2 dimension (2D) array. The pixel array may include several millions of unit pixels to several tens of millions of unit pixels. The image sensor 290 may be implemented with a charge-coupled device (CCD) or a complementary metal-oxide-semiconductor (CMOS).

The connector 291 may be a connection terminal for connecting the camera module 200 with the electronic device 100. According to various embodiments, the camera module 200 may transmit image data, which is created by the image sensor 290, to the electronic device 100 through an interface (e.g., mobile industry processor interface; MIPI).

According to certain embodiments of the present disclosure, the components having the same reference numerals as those of the camera module 200 illustrated in FIGS. 2A, 2B, and 2C may have the same descriptions as those of FIGS. 2A, 2B, and 2C.

FIGS. 3A, 3B, 3C, 3D, and 3E may illustrate driving units according to various embodiments.

Referring to the non-limiting example of FIGS. 3A, 3B, 3C, 3D, and 3E, driving units 300a, 300b, 300c, 300d, and 300e may include a coil 310, a magnet 320, and magnet substances 330a, 330b, 330c, 330d, and 330e. The driving units 300a, 300b, 300c, 300d, and 300e illustrated in FIGS. 3A, 3B, 3C, 3D, and 3E may correspond to driving units (e.g., the second driving unit 250 and the third driving unit 260) illustrated in FIGS. 2A, 2B, and 2C. According to certain embodiments, the driving units 300a, 300b, 300c, 300d, and 300e may be solenoid-type voice coil motors. According to various embodiments, the driving units 300a, 300b, 300c, 300d, and 300e may further include components different from the above-described components. For example, the driving unit 300c may further include a non-magnetic substance 340c physically coupled to the magnetic substance 330c.

According to various embodiments, each of the driving units 300a, 300b, 300c, 300d, and 300e may include a plurality of coils 310. According to some embodiments, the plurality of coils 310 may include a first coil or a second coil. According to various embodiments, the plurality of coils 310, which are the first coil and the second coil, may be arranged to be spaced apart from each other by a first distance. The first distance may have various values depending on distances that the lens moves.

According to certain embodiments, when a current flows through the coil 310 in a specified direction, the direction (e.g., the first direction) of a magnetic field is determined according to Ampere's right-handed screw rule and the magnetic field causes the magnet 320 to generate magnetic force. The magnet 320 may move along a specified path having the first distance by the magnetic field made by the coil 310. When the magnet 320 moves, a lens module coupled to the magnet 320 may be moved.

According to some embodiments, the intensity and the direction of the current flowing through the coil 310 may be adjusted. According to various embodiments, the coil 310 may be electrically connected with a control circuit included in the camera module 200 or a control circuit included in the electronic device 100 coupled to the camera module 200. The control circuit may adjust the intensity or the direction of a current flowing through the coil 310. When the current is adjusted, the intensity or the direction of the magnetic field formed by the coil 310 is changed to change the movements of the magnet 320 and the lens module coupled to the magnet 320.

Figure 3A:
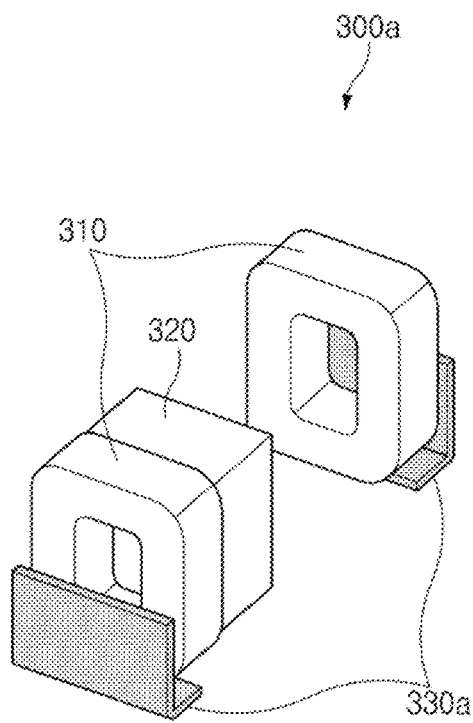
FIG. 3A illustrates a driving unit, according to certain embodiments.

Each of the magnetic substances 330a, 330b, 330c, 330d, and 330e may be, for example, disposed outside the coils 310 as illustrated in FIG. 3A. In other words, each of the magnetic substances 330a, 330b, 330c, 330d, and 330e may be disposed adjacent to another surface of the coil 310 opposite to one surface of the coil 310 adjacent to the magnet 320.

According to certain embodiments, each of the magnetic substances 330a, 330b, 330c, 330d, and 330e may produce an attractive force (magnetic force) together with the magnet 320 such that each of the magnetic substances 330a, 330b, 330c, 330d, and 330e and the magnet 320 attract each other. The magnetic force may be inversely proportional to the square of the distance between each of the magnetic substances 330a, 330b, 330c, 330d, and 330e and the magnet 320. According to some embodiments, when the lens modules arrive at a specified position by the magnetic force, for example, when the magnet 320 becomes closer to the coil 310, each of the magnetic substances 330a, 330b, 330c, 330d, and 330e brings the magnet 320 into close contact with the coil 310. When the magnet 320 is in close contact with the coil 310, the lens module may be adapted to the specified position to be maintained in an exact posture without being inclined.

According to various embodiments, when the lens module is adapted to the specified position, the intensity of the magnetic field produced by the coil 310 may be reduced. For example, the control circuit, which may be included in the camera module 200 or the electronic device 100 coupled to the camera module 200, may reduce a current flowing through the coil 310, thereby reducing the intensity of the magnetic field. According to certain embodiments, when the lens module is adapted to the specified position, producing the magnetic field may be stopped. For example, the control circuit may prevent the current from flowing through the coil 310 such that the magnetic field is not formed.

According to some embodiments, even if the intensity of the magnetic field is reduced or even if the magnetic field is not produced any more, the lens module may be adapted to the specified position by the magnetic force between the magnet 320 and each of the magnetic substances 330a, 330b, 330c, 330d, and 330e.

According to various embodiments, the lens module, which is adapted to the specified position by the magnetic force between the magnet 320 and each of the magnetic substances 330a, 330b, 330c, 330d, and 330e, may become temporarily out of the specified position by an external impulse. In this case, each of the driving units 300a, 300b, 300c, 300d, and 300e may return the lens module to the specified position by temporarily increasing the intensity of the magnetic field produced by the coil 310. When the lens module is returned to the specified position, the intensity of the magnetic field produced by the coil 310 may be reduced.

According to certain embodiments, the lens module adapted to the specified position may move in an opposite direction. In this case, the direction of the magnetic field made by the current flowing through the coil 310 may be the second direction opposite to the first direction.

According to some embodiments, the intensity of the driving force made by the magnetic field may be greater than the intensity of the magnetic force acting between each of the magnetic substances 330a, 330b, 330c, 330d, and 330e and the magnet 320. The magnet 320 and the lens module may move in an opposition direction (e.g., the second direction) by the driving force having the intensity greater than the intensity of the magnetic force.

According to various embodiments, the magnetic substances 330a, 330b, 330c, 330d, and 330e may be formed in various configurations. According to various embodiments, magnetic substances 330a may be disposed at opposite ends of the coils to be separated from each other. In this case, in the section that the magnet 320 moves, the intensity of the magnetic force between the magnet 320 and the magnet substance 330a represents a small value. Accordingly, the lens module may smoothly move.

Figure 3B:
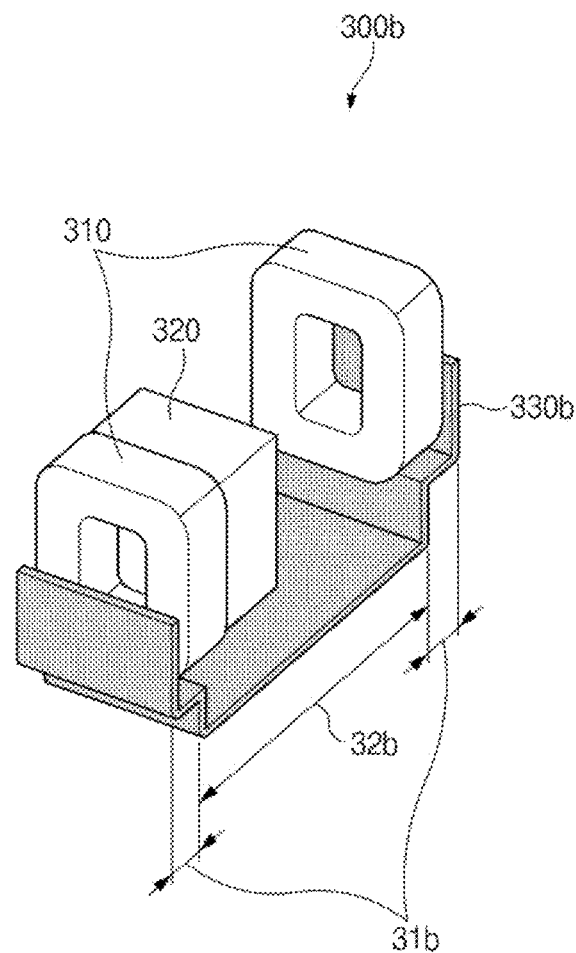
FIG. 3B illustrates a driving unit, according to some embodiments.

According to another embodiment, as illustrated in FIG. 3B, magnetic substances 330b may be connected with each other while extending along the path (movement path), on which the magnet 320 moves, from opposite ends of coils 310 (or inward from the coil 310). In other words, the magnetic substances 330b may surround the opposite ends of the coils 310 without being separated from each other, which is different from the magnetic substances 330a illustrated in the illustrative example shown in FIG. 3A. According to certain embodiments, the magnetic substance 330b may be more bent downward in the section (e.g., the second section 32b) that the magnet 320 moves, as compared to a section (e.g., the first section 31b) that the magnet 320 is adapted. In this case, the intensity of the magnetic field acting on the magnet 320 in a direction perpendicular to a direction of the path in the second section 32b may be less than the intensity of the magnetic field acting on the magnet 320 in the direction perpendicular to the direction of the movement path in the first section 31b. According to some embodiments, since the intensity of the magnetic force between the magnet 320 and the magnetic substance 330b represents a smaller value in the second section 32b than in the first section 31b, the lens module may be smoothly moved.

Figure 3C:
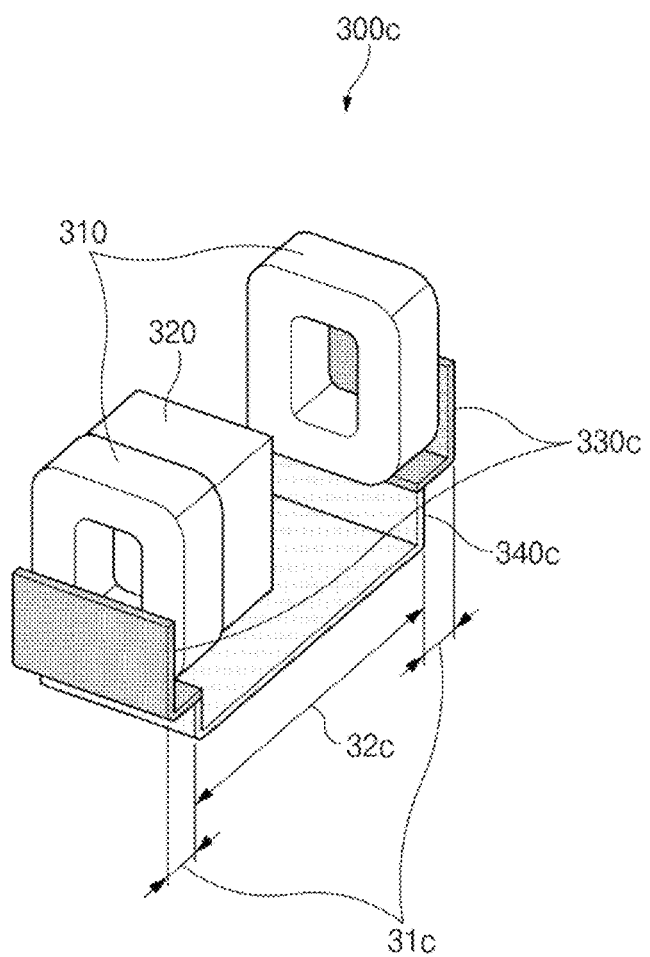
FIG. 3C illustrates a driving unit, according to various embodiments.

According to another embodiment, as illustrated in FIG. 3C, magnetic substances 330c are disposed outside the coils 310 in such a manner that the magnetic substances 330c are separated from each other in a first section 31c and are connected with each other in a second section 32c by the non-magnetic substance 340c. In other words, the non-magnetic substance 340c may be physically coupled to the magnetic substance 330c and may extend in the direction of the movement path of the magnet 320 from the magnetic substances 330c. Even in this case, since the intensity of the magnetic force between the magnet 320 and the magnetic substance 330c represents a smaller value in the second section 32c than in the first section 31c, the lens module may be smoothly moved.

Figure 3D:
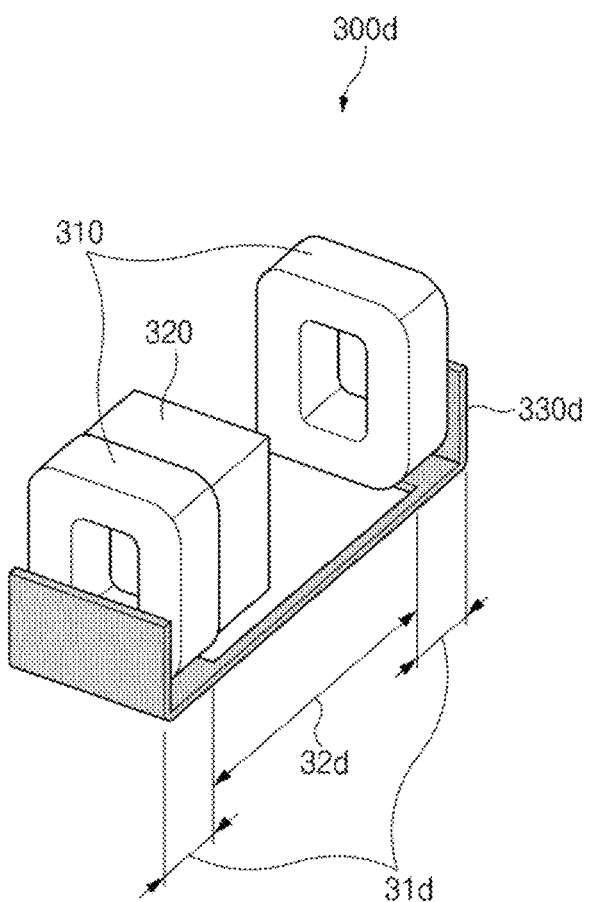
FIG. 3D illustrates a driving unit, according to certain embodiments.

According to another embodiment, as illustrated in FIG. 3D, an opening is formed in at least a portion of a second section 32d while surrounding opposite ends of the coil. Since the opening is formed in the second section 32d, the intensity of the magnetic force between the magnet 320 and the magnetic substance 330d may represent a smaller value in the second section 32d than in a first section 31d. Even in this case, the lens module may smoothly move.

Figure 3E:
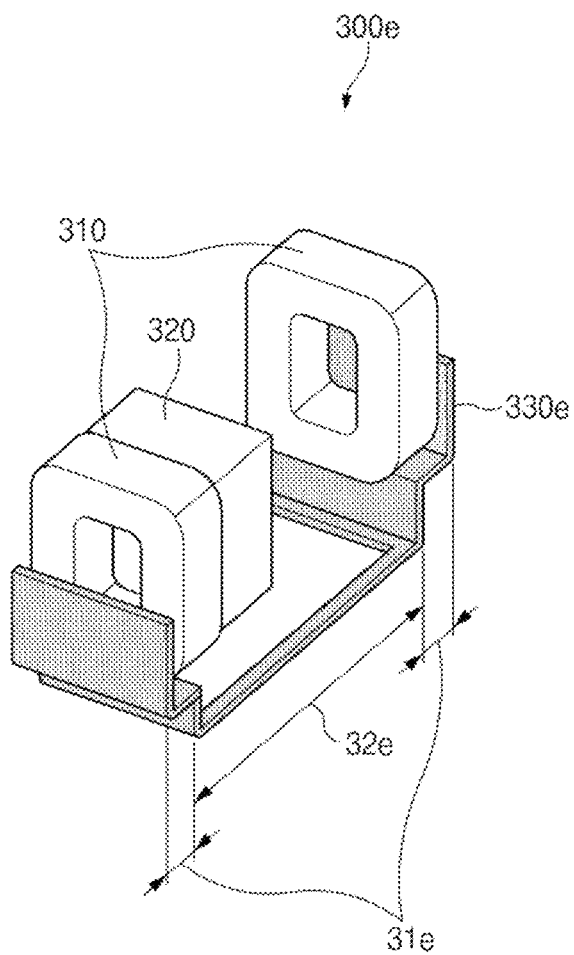
FIG. 3E illustrates a driving unit, according to some embodiments.

According to another embodiment, as illustrated in FIG. 3E, the magnetic substance 330e may have an opening formed in at least a portion of a second section 32e and may have the form bent downward in the second section 32e, as illustrated in FIG. 3E. In other words, the magnetic substance 330e may have the form that an opening is formed in at least a portion of the magnetic substance 330b illustrated in FIG. 3B. Even in this case, as described above, since the intensity of the magnetic force between the magnet 320 and the magnetic substance 330e represents a smaller value in the second section 32e than in the first section 31e, the lens module may be smoothly moved.

Figure 4:
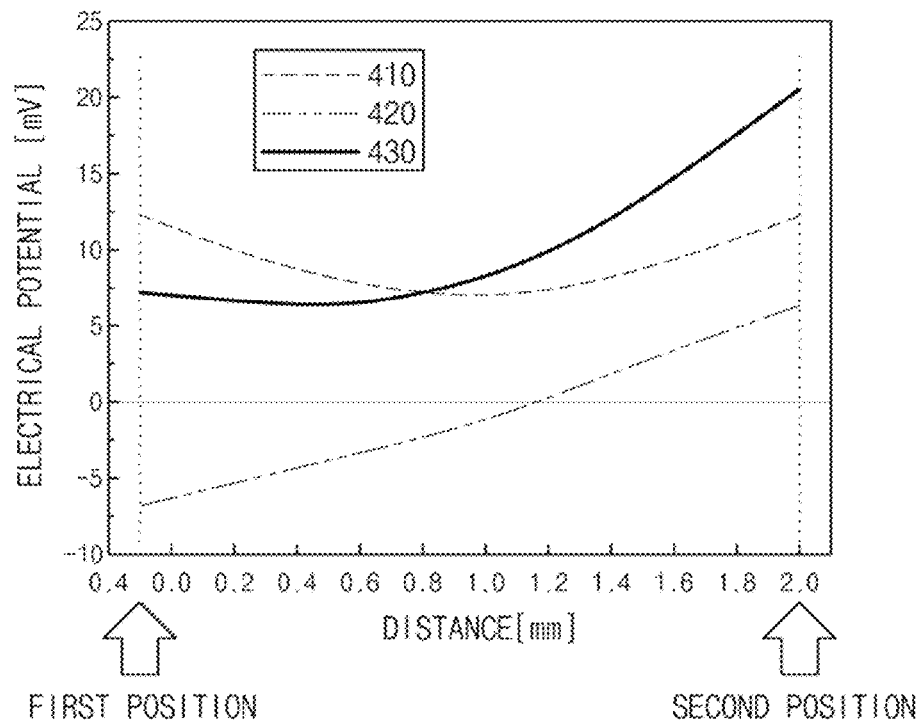
FIG. 4 illustrates an intensity of a force acting on a magnet, according to various embodiments.

FIG. 4 illustrates the intensity of force acting on a magnet, according to various embodiments.

Referring to the non-limiting example of FIG. 4, when the lens module moves from a first position to a second position, the intensity of force acting on the magnet is shown.

A first graph 410 may indicate driving forces made by magnetic fields produced by coils. According to certain embodiments, currents flowing through a plurality of coils may have equal intensities and the same directions. In this case, the driving force may be the resultant force of driving forces made by magnetic fields produced by the coils. According to some embodiments, the driving forces may be represented bilaterally symmetrically on the movement path of the lens module as illustrated in the first graph 410 illustrated in FIG. 4.

A second graph 420 may indicate the intensity of magnetic force acting between a magnet and a magnetic substance. According to various embodiments, it may be understood that the direction from the first position to the second position is a positive direction and the direction from the second position to the first position is a negative direction. According to certain embodiments, when the lens module is at the first position, strong magnetic force acts on the magnet in the negative direction by the magnetic substance adjacent to the first position, and weak magnetic force acts on the magnet in the positive direction by the magnetic substance adjacent to the second position. The resultant force of two magnetic forces represents a negative value. According to some embodiments, when the lens module is at the second position, strong magnetic force acts on the magnet in the positive direction by the magnetic substance adjacent to the second position, and weak magnetic force acts on the magnet in the negative direction by the magnetic substance adjacent to the first position. The resultant force of two magnetic forces represents a positive value.

A third graph 430 may indicate the resultant force of the driving forces made by the magnetic field and the magnetic force. According to various embodiments, the intensity of the driving force may be greater than the intensity of the magnetic force such that the lens module moves from the first position to the second position. According to certain embodiments, as the lens module gradually approaches the second position, the intensity of the force acting on the magnet may be increased.

Figure 5A:
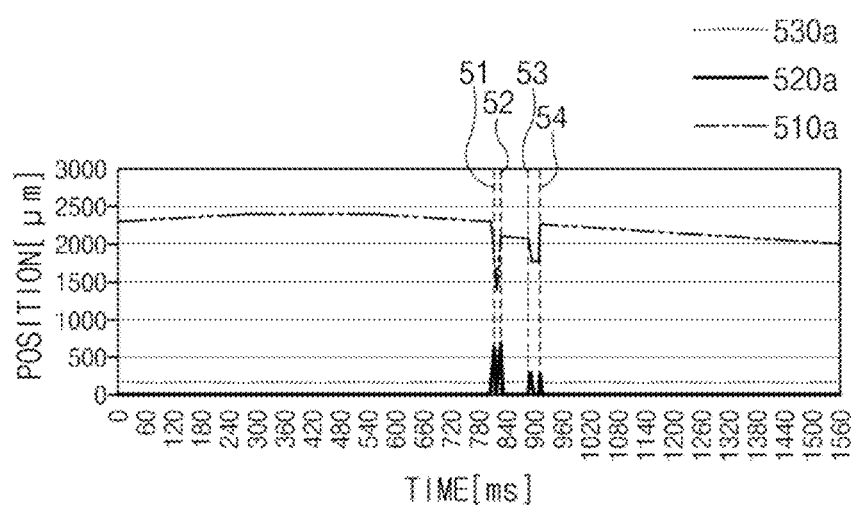
FIG. 5A illustrates a position sensing result of a lens, according to certain embodiments.

FIG. 5A illustrates a position sensing result of a lens, according to some embodiments.

Figure 5B:
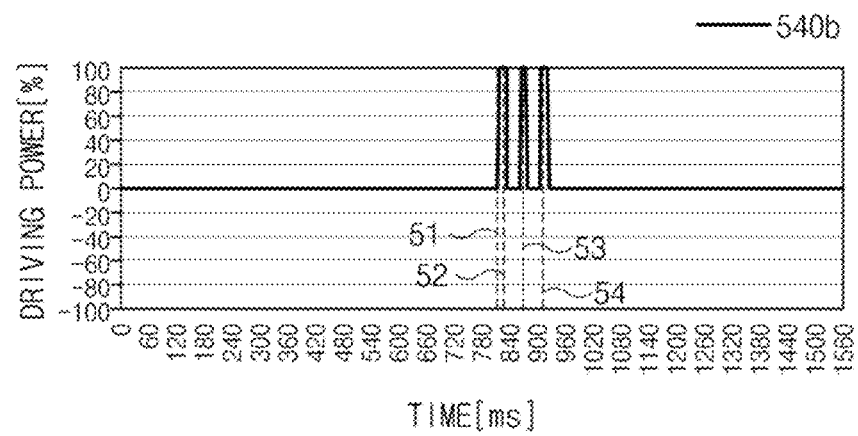
FIG. 5B illustrates a driving power of a camera module, according to some embodiments.

FIG. 5B illustrates a driving power of a camera module, according to various embodiments.

Referring to the non-limiting examples of FIGS. 5A and 5B, a first graph 510a may indicate the position sensing result of the lens module. A second graph 520a may indicate the difference between a position of the lens module, which is currently measured, and a position of the lens module, which is measured right before. A third graph 530a may indicate a threshold value of the position difference. A fourth graph 540b may indicate driving power made by a magnetic field produced by a coil.

According to certain embodiments, the camera module 200 may include a sensor to sense the position of the lens module. According to some embodiments, the camera module 200 may adjust the driving power based on the sensing result of the sensor, thereby adapting the lens module to a specified position and reducing current consumption. For example, when the lens module is sensed at the specified position, the camera module 200 may remove the driving power and may adapt the lens module to the specified position by magnetic force between a magnet and a magnetic substance. For another example, when the lens module is spaced apart from the specified position by a distance exceeding the threshold value, the driving power is generated to move the lens module to the specified position.

According to various embodiments, the sensor, which senses the position of the lens module, may measure the position of the lens module at specific time intervals. Referring to the first graph 510a, it may be determined that the position of the lens module is changed in a section (e.g., a first section) between a first point 51 and a second point 52. Although the position of the lens module is not changed in a section (e.g., a second section) between the second point 52 and a third point 53, it may be determined that the lens module is not placed at the specified position. It may be recognized that the position of the lens module may be changed in a section (e.g., a third section) between the third point 53 and a fourth point 54.

Referring to the second graph 520a and the third graph 530a, it may be recognized that the position differences in the first section and the third section may exceed the threshold value. It may be recognized that the position difference in the second section does not exceed the threshold value.

According to certain embodiments, since the position differences in the first section and the third section exceed the threshold value, it may be determined that the lens module is spaced apart from the specified position by a distance exceeding the threshold value. In this case, the camera module 200 may generate driving power by increasing a current flowing through a coil. Referring to the fourth graph 540b, it may be determined that the driving power is increased in the section.

According to some embodiments, even if the measured position difference does not exceed the threshold value, if the difference from the initial position exceeds the threshold value, it may be determined that the lens module is spaced apart from the specified position by a distance exceeding the threshold value. For example, since the difference from a specified position, which is the initial position, exceeds the threshold value in the second section, it may be determined that the lens module is spaced apart from the specified position by a distance exceeding the threshold value in the second section. In this case, the camera module 200 may generate driving power by increasing a current flowing through a coil. Referring to the fourth graph 540b, it may be determined that the driving power is increased in the second section.

Figure 5C:
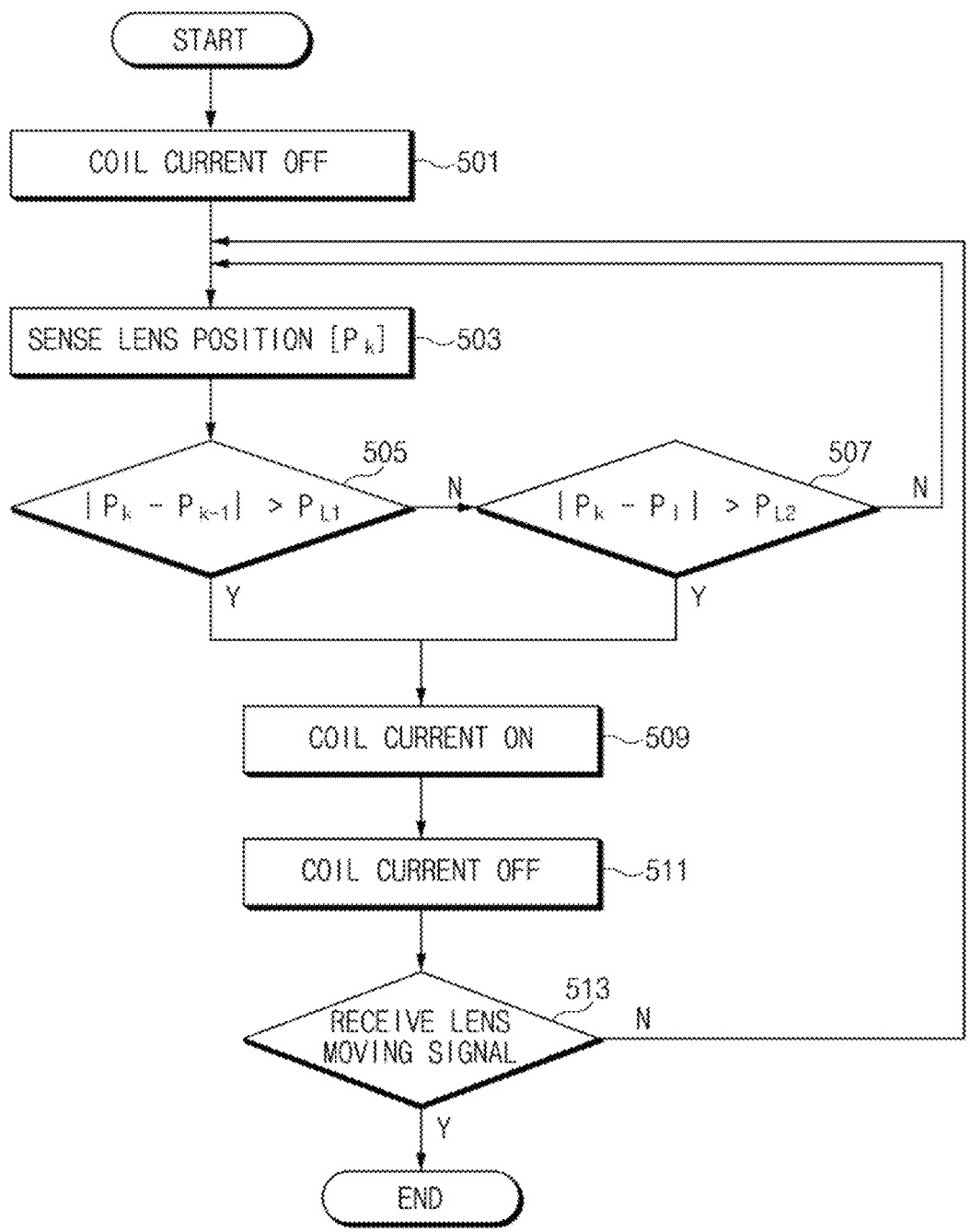
FIG. 5C illustrates operations of a method of adapting a lens to a specified position, according to various embodiments.

FIG. 5C is a flowchart illustrating an operation of adapting a lens to a specified position, according to various embodiments.

Referring to the non-limiting example shown in FIG. 5C, according to certain embodiments, an operation that the camera module 200 adapts the lens module to the specified position may include operation 501 to operation 513. According to some embodiments, operation 501 to operation 513 may be performed by a control circuit or a processor that may be included in the camera module 200 or the electronic device 100 coupled to the camera module 200.

In operation 501, when the lens module arrives at the specified position, a current flowing through a coil may be blocked. According to various embodiments, the current flowing through the coil may not be completely blocked, but may flow with high intensity. The driving power made by a magnetic field produced by the coil may be blocked or reduced. In this case, the lens module may be adapted to the specified position by magnetic force between a magnet and a magnetic substance. The lens module may be maintained in an exact posture by the magnetic force without being inclined.

In operation 503, a position sensor included in the camera module 200 may sense the position of the lens module at specified time intervals. According to certain embodiments, the $k^{th}$ measured position of the lens module may be expressed as $P_k$.

In operation 505, the position $P_k$ of the lens module measured in operation 503 may be compared with $P_{k-1}$, which is a position of the lens module measured right before, in size. When the difference between $P_k$ and $P_{k-1}$ is smaller than a specified threshold value $P_{L1}$, operation 507 may be performed. When the difference between $P_k$ and $P_{k-1}$ is is greater than $P_{L1}$, operation 509 may be performed.

In operation 507, the measured position $P_k$ of the lens module may be compared with $P_I$ in size. If the difference between $P_k$ and $P_I$ is smaller than a specified threshold value $P_{L2}$ operation 503 may be performed again. If the difference between $P_k$ and $P_I$ is greater than $P_{L2}$, operation 509 may be performed.

In operation 509, the coil current may be increased again. When the coil current is increased, the intensity of the magnetic field formed by the coil may be increased, and the intensity of the driving power may be increased. Since it is determined that the position of the lens module is spaced apart from the specified position by a distance exceeding the threshold value as determination results of operation 505 or operation 507, the current of the coil may be increased and the lens module may be returned to the specified position.

In operation 511, the coil current may be blocked again. According to some embodiments, the current flowing through the coil may not be completely blocked, but may flow with fine intensity. Since the lens module is returned to the specified position through operation 509, the coil current may be reduced and the current consumption may be reduced.

In operation 513, it may be determined whether to move the lens module. According to various embodiments, when the moving signal is received, operation 501 to operation 513 are terminated and an operation of moving the lens module to an opposition position (e.g., an operation of moving from the first position to the second position) may be performed. According to certain embodiments, when the moving signal is not received, operation 503 may be performed again.

Figure 6A:
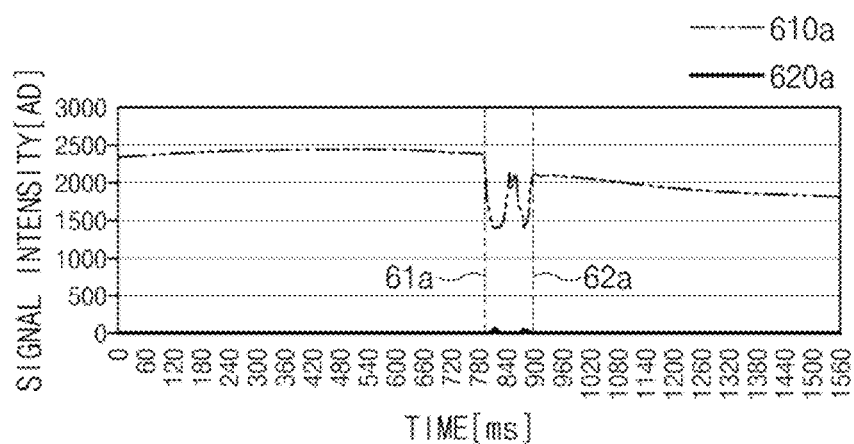
FIG. 6A illustrates a measurement result of a vibration sensor, according to certain embodiments.

FIG. 6A illustrates an example of a measurement result at a vibration sensor, according to some embodiments.

Figure 6B:
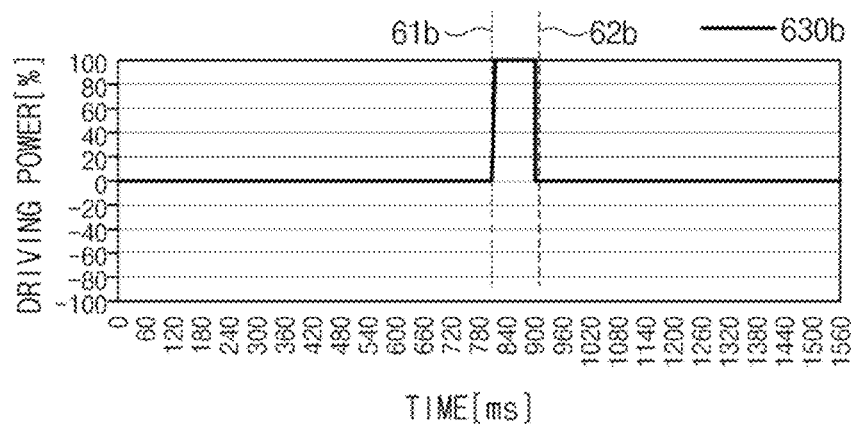
FIG. 6B illustrates driving power of a camera module, according to some embodiments.

FIG. 6B illustrates an example of driving power of a camera module, according to various embodiments.

Referring to the non-limiting example shown in FIGS. 6A and 6B, a first graph 610a may indicate a signal intensity of the vibration sensor. A second graph 620a may indicate the vibration in the position of the lens module. A third graph 630b may indicate driving power made by a magnetic field produced by a coil.

According to certain embodiments, the camera module 200 or the electronic device 100 coupled to the camera module 200 may include a vibration sensor. The vibration sensor may be, for example, a gyro sensor. According to some embodiments, the camera module 200 may adjust the driving power based on the sensing result of the vibration sensor, thereby adapting the lens module to a specified position and reducing current consumption.

According to various embodiments, if the vibration sensor senses that the camera module 200 or the electronic device 100 is shaken, it may be presumed that an impulse has been applied to the camera module 200 or the electronic device 100. If the impulse is applied to the camera module 200 or the electronic device 100, it may be presumed that the lens module moves due to the impulse. For example, if a signal from the vibration sensor is changed between a first point 61*a* and a second point 62*a* of a first graph 610*a*, it may be recognized that vibration having a size exceeding the threshold value is applied to the camera module 200 or the electronic device 100. In this case, it is presumed that an impulse is applied to the camera module 200 or the electronic device 100 between the first point 61*a* and the second point 62*a*. Referring to the second graph 620*a*, it may be recognized that the position of the lens module is changed between the first point 61*a* and the second point 62*a*.

According to certain embodiments, if the vibration having the size exceeding the threshold value is sensed by the vibration sensor, the camera module 200 may adapt the lens module to the specified position by increasing the driving power. Referring to the third graph 630*b*, it may be recognized that the driving power may be increased between the first point 61*b* and the second point 62*b*.

The lens module may be adapted to the specified position through the above procedure.

According to some embodiments, the camera module 200 or the electronic device 100 coupled to the camera module 200 may include an acceleration sensor. The camera module 200 may adapt the lens module to the specified position by using the acceleration sensor identically to or similarly to the embodiment.

Figure 7:
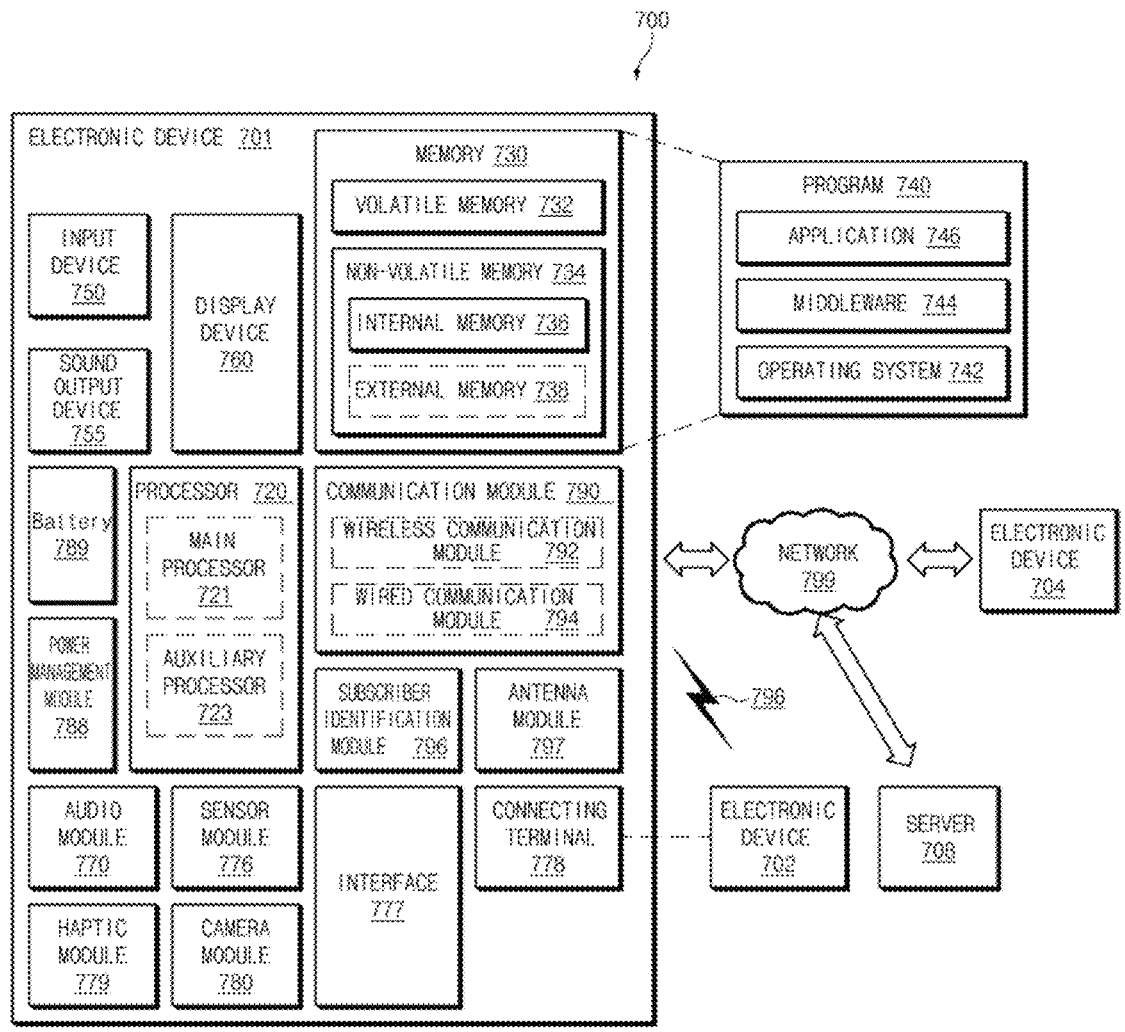
FIG. 7 is a block diagram illustrating an electronic device under a network environment, according to various embodiments.

FIG. 7 illustrates, in block diagram format, an electronic device in a network environment according to various embodiments.

Referring to FIG. 7, an electronic device 701 (e.g., the electronic device 100) may communicate with an electronic device 702 through a first network 798 (e.g., a short-range wireless communication) or may communicate with an electronic device 704 or a server 708 through a second network 799 (e.g., a long-distance wireless communication) in a network environment 700. According to various embodiments, the electronic device 701 may communicate with the electronic device 704 through the server 708. According to certain embodiments, the electronic device 701 may include a processor 720, a memory 730, an input device 750, a sound output device 755, a display device 760, an audio module 770, a sensor module 776, an interface 777, a haptic module 779, a camera module 780 (e.g., the camera module 200), a power management module 788, a battery 789, a communication module 790, a subscriber identification module 796, and an antenna module 797. According to some embodiments, at least one (e.g., the display device 760 or the camera module 780) among components of the electronic device 701 may be omitted or other components may be added to the electronic device 701. According to some embodiments, some components may be integrated and implemented as in the case of the sensor module 776 (e.g., a fingerprint sensor, an iris sensor, or an illuminance sensor) embedded in the display device 760 (e.g., a display).

The processor 720 may operate, for example, software (e.g., a program 740) to control at least one of other components (e.g., a hardware or software component) of the electronic device 701 connected to the processor 720 and may process and compute a variety of data. The processor 720 may load a command set or data, which is received from other components (e.g., the sensor module 776 or the communication module 790), into a volatile memory 732, may process the loaded command or data, and may store result data into a nonvolatile memory 734. According to some embodiments, the processor 720 may include a main processor 721 (e.g., a central processing unit or an application processor) and an auxiliary processor 723 (e.g., a graphic processing device, an image signal processor, a sensor hub processor, or a communication processor), which operates independently from the main processor 721, additionally or alternatively uses less power than the main processor 721, or is specified to a designated function. In this case, the auxiliary processor 723 may operate separately from the main processor 721 or be embedded within main processor 721.

In this case, the auxiliary processor 723 may control, for example, at least some of functions or states associated with at least one component (e.g., the display device 760, the sensor module 776, or the communication module 790) among the components of the electronic device 701 instead of the main processor 721 while the main processor 721 is in an inactive (e.g., sleep) state or together with the main processor 721 while the main processor 721 is in an active (e.g., an application execution) state. According to various embodiments, the auxiliary processor 723 (e.g., the image signal processor or the communication processor) may be implemented as a part of another component (e.g., the camera module 780 or the communication module 790) that is functionally related to the auxiliary processor 723. The memory 730 may store a variety of data used by at least one component (e.g., the processor 720 or the sensor module 776) of the electronic device 701, for example, software (e.g., the program 740) and input data or output data with respect to commands associated with the software. The memory 730 may include the volatile memory 732 or the nonvolatile memory 734.

The program 740 may be stored in the memory 730 as software and may include, for example, an operating system 742, a middleware 744, or an application 746.

The input device 750 may be a device for receiving a command or data, which is used for a component (e.g., the processor 720) of the electronic device 701, from an outside (e.g., a user) of the electronic device 701 and may include, for example, a microphone, a mouse, or a keyboard.

The sound output device 755 may be a device for outputting a sound signal to the outside of the electronic device 701 and may include, for example, a speaker used for general purposes, such as multimedia play or recordings play, and a receiver used only for receiving calls. According to certain embodiments, the receiver and the speaker may be either integrally or separately implemented.

The display device 760 may be a device for visually presenting information to the user and may include, for example, a display, a hologram device, or a projector and a control circuit for controlling a corresponding device. According to some embodiments, the display device 760 may include a touch circuitry or a pressure sensor for measuring an intensity of pressure on the touch.

The audio module 770 may convert a sound and an electrical signal in dual directions. According to various embodiments, the audio module 770 may obtain the sound through the input device 750 or may output the sound through an external electronic device (e.g., the electronic device 702 (e.g., a speaker or a headphone)) wired or wirelessly connected to the sound output device 755 or the electronic device 701.

The sensor module 776 may generate an electrical signal or a data value corresponding to an operating state (e.g., power or temperature) inside or an environmental state outside the electronic device 701. The sensor module 776 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 777 may support a designated protocol wired or wirelessly connected to the external electronic device (e.g., the electronic device 702). According to certain embodiments, the interface 777 may include, for example, an HDMI (high-definition multimedia interface), a USB (universal serial bus) interface, an SD card interface, or an audio interface.

A connecting terminal 778 may include a connector that physically connects the electronic device 701 to the external electronic device (e.g., the electronic device 702), for example, an HDMI connector, a USB connector, an SD card connector, or an audio connector (e.g., a headphone connector).

The haptic module 779 may convert an electrical signal to a mechanical stimulation (e.g., vibration or movement) or an electrical stimulation perceived by the user through tactile or kinesthetic sensations. The haptic module 779 may include, for example, a motor, a piezoelectric element, or an electric stimulator.

The camera module 780 may shoot a still image or a video image. According to some embodiments, the camera module 780 may include, for example, at least one lens, an image sensor, an image signal processor, or a flash.

The power management module 788 may be a module for managing power supplied to the electronic device 701 and may serve as at least a part of a power management integrated circuit (PMIC).

The battery 789 may be a device for supplying power to at least one component of the electronic device 701 and may include, for example, a non-rechargeable (primary) battery, a rechargeable (secondary) battery, or a fuel cell.

The communication module 790 may establish a wired or wireless communication channel between the electronic device 701 and the external electronic device (e.g., the electronic device 702, the electronic device 704, or the server 708) and support communication execution through the established communication channel. The communication module 790 may include at least one communication processor operating independently from the processor 720 (e.g., the application processor) and supporting the wired communication or the wireless communication. According to various embodiments, the communication module 790 may include a wireless communication module 792 (e.g., a cellular communication module, a short-range wireless communication module, or a GNSS (global navigation satellite system) communication module) or a wired communication module 794 (e.g., an LAN (local area network) communication module or a power line communication module) and may communicate with the external electronic device using a corresponding communication module among them through the first network 798 (e.g., the short-range communication network such as a Bluetooth, a WiFi direct, or an IrDA (infrared data association)) or the second network 799 (e.g., the long-distance wireless communication network such as a cellular network, an internet, or a computer network (e.g., LAN or WAN)). The above-mentioned various communication modules 790 may be implemented into one chip or into separate chips, respectively.

According to certain embodiments, the wireless communication module 792 may identify and authenticate the electronic device 701 using user information stored in the subscriber identification module 796 in the communication network.

The antenna module 797 may include one or more antennas to transmit or receive the signal or power to or from an external source. According to some embodiments, the communication module 790 (e.g., the wireless communication module 792) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to various embodiments, the command or data may be transmitted or received between the electronic device 701 and the external electronic device 704 through the server 708 connected to the second network 799. Each of the electronic devices 702 and 704 may be the same or different types as or from the electronic device 701. According to certain embodiments, all or some of the operations performed by the electronic device 701 may be performed by another electronic device or a plurality of external electronic devices. When the electronic device 701 performs some functions or services automatically or by request, the electronic device 701 may request the external electronic device to perform at least some of the functions related to the functions or services, in addition to or instead of performing the functions or services by itself. The external electronic device receiving the request may carry out the requested function or the additional function and transmit the result to the electronic device 701. The electronic device 701 may provide the requested functions or services based on the received result as is or after additionally processing the received result. To this end, for example, a cloud computing, distributed computing, or client-server computing technology may be used.

Figure 8:
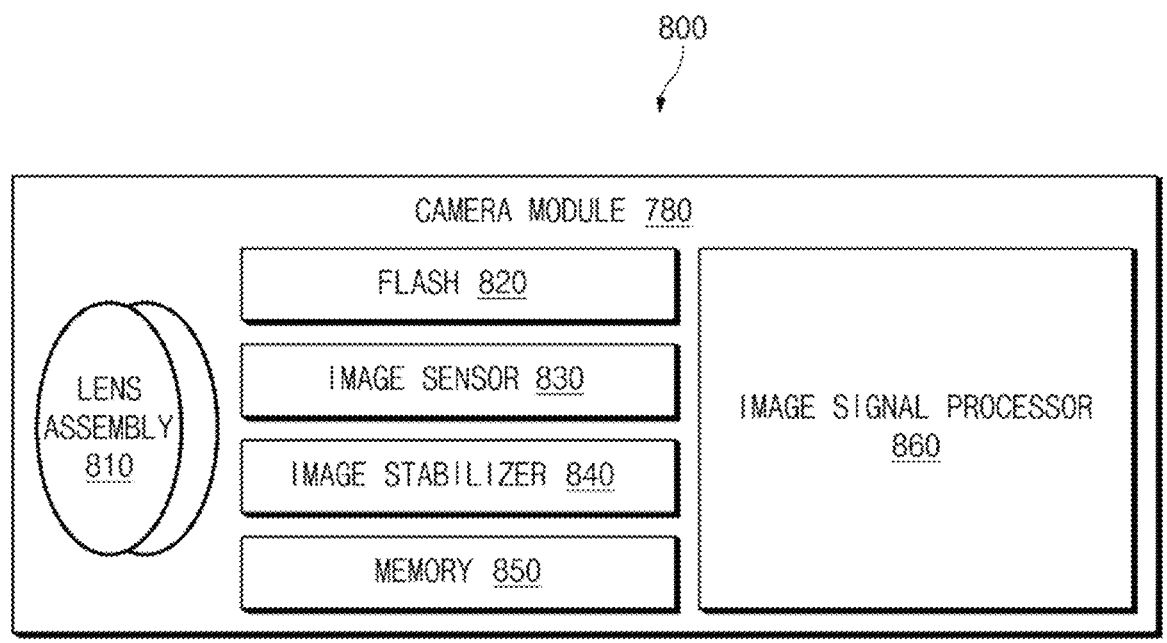
FIG. 8 is a block diagram of a camera module according to various embodiments.

FIG. 8 illustrates, in block diagram format, a camera module according to various embodiments.

Referring to FIG. 8, the camera module 780 (for example, camera module 200 in FIG. 1) may include a lens assembly 810 (for example, lens unit 230 in FIG. 2), a flash 820 (for example, flash 120 in FIG. 1), an image sensor 830 (for example, the image sensor 290 in FIG. 2), an image stabilizer 840, a memory (e.g., a buffer memory) 850, or an image signal processor 860. The lens assembly 810 may collect light emitted from a subject which is an object of image capturing. The lens assembly 810 may include one or more lenses. According to some embodiments, the camera module 780 may include a plurality of lens assemblies 810. In this case, the camera module 780 may be, for example, a dual camera, a 360-degree camera, or a spherical camera. The plurality of lens assemblies 810 may have the same lens properties (e.g., a field of view, a focal length, an autofocus, an f number, or an optical zoom), or at least one lens assembly may be different from another lens assembly in at least one lens attribute. For example, the lens assembly 810 may include a wide-angle lens or a telephoto lens. The flash 820 may emit light in order to strengthen light emitted from the subject. The flash 820 may include one or more light emitting diodes (e.g., a red-green-blue (RGB) LED, a white LED, an infrared LED, or an ultraviolet LED), or a xenon lamp.

The image sensor 830 may acquire an image corresponding to the subject by converting light, which is received from the subject through the lens assembly 810, to an electrical signal. According to various embodiments, the image sensor 830 may include, for example, one selected from image sensors having different properties, such as an RGB sensor, a black and white (BW) sensor, an IR sensor, or a UV sensor, a plurality of image sensors having the same property, or a plurality of image sensors having different properties. For example, each image sensor included in the image sensor 830 may be implemented with a charged coupled device (CCD) sensor or a complementary metal oxide semiconductor (CMOS) sensor.

The image stabilizer 840 may move or control (e.g., adjustment of read-out timing, and the like) at least one lens included in the lens assembly 810 or the image sensor 830 in a specific direction to at least partially compensate for a negative effect (e.g., image blurring) exerted on the captured image due to movement of the camera module 780 or the electronic device 701 including the camera module 780. According to certain embodiments, the image stabilizer 840 may be implemented, for example, with an optical image stabilizer and may detect the movement by using a gyro sensor (not illustrated) or an acceleration sensor (not illustrated) located inside or outside the camera module 780.

The memory 850 may at least temporarily store at least a part of the image obtained through the image sensor 830 for a next image processing operation. For example, when image acquisition by the shutter is delayed or a plurality of images are acquired at a high speed, the acquired original image (e.g., a high-resolution image) is stored in the memory 850, and a copy image (e.g., a low-resolution image) corresponding to the original image may be previewed through the display device 760. Then, when a specified condition (e.g., a user input or system instruction) is satisfied, at least a part of the original image stored in the memory 850 may be obtained and processed, for example, by the image signal processor 860. According to some embodiments, the memory 850 may be implemented with at least a part of the memory 730 or a separate memory operated independent of the memory 730.

The image signal processor 860 may perform image processing (e.g., depth map generation, three-dimensional modeling, panorama generation, feature point extraction, image composition, or image compensation (e.g., noise reduction, resolution adjustment, brightness adjustment, blurring, sharpening, or softening)) with respect to an image acquired through the image sensor 830 or an image stored in the memory 850. Additionally or alternatively, the image signal processor 860 may perform control operation (e.g., exposure time control, lead-out timing control, or the like) of at least one of the components (e.g., the image sensor 830) included in the camera module 780. The image processed by the image signal processor 860 may be re-stored in the memory 850 for additional processing or may be transmitted to an external component (e.g., the memory 730, the display device 760, the electronic device 702, the electronic device 704, or the server 708) of the camera module 780. According to various embodiments, the image signal processor 860 may be configured as at least a part of the processor 720, or may be configured as a separate processor operating independently of the processor 720. When the image signal processor 860 is configured as a separate processor, the images processed by the image signal processor 860 may be displayed by the processor 720 through the display device 760 as they are or after being additionally image-processed.

According to certain embodiments, the electronic device 701 may include two or more camera modules 780 having mutually different properties or functions. In this case, for example, the at least one camera module 780 may be a wide-angle camera or a front camera and at least one other camera module may be a telephoto camera or a rear camera.

According to embodiments disclosed in the present disclosure, the mobility of the lens in the camera module may be ensured and the lens may be exactly adapted to a specified position. Accordingly, a user may obtain an undistorted and clear image by using the camera module.

According to embodiments disclosed in the present disclosure, since a current to be consumed in the camera module may be saved, the available time of the camera module and the electronic device including the camera module may be increased.

According to some embodiments, a camera module may include a lens unit including one or more lenses, wherein at least some of the one or more lenses are movable along a path corresponding to optical axes of the one or more lenses, and a driving unit to move the at least some lenses along the path. The driving unit may include a magnet physically connected with the at least some lenses, a coil to form a magnetic field such that the magnet moves along the path, and a magnetic substance disposed on one surface of the coil opposite to another surface of the coil, which is adjacent to the magnet. The magnetic substance may adapt the at least some lenses, which are physically connected with the magnet, to a specified position of the path by using magnetic force between the magnet and the magnetic substance, which is formed as the coil approaches the magnet.

According to various embodiments, the magnetic substance may be bent and extends in a direction of the path that the at least some lenses move. The path may include a first section in which the magnet is adapted and a second section in which the magnet is moved. An intensity of magnetic force acting between the magnet and the magnetic substance in the first section may be less than an intensity of magnetic force acting between the magnet and the magnetic substance in the second section.

According to certain embodiments, the camera module may further include a non-magnetic substance physically connected with the magnetic substance. The non-magnetic substance may be bent from the magnetic substance and may extend in a direction of the path that the at least some lenses move, According to some embodiments, when the at least some lenses are adapted to the specified position, an intensity of the magnetic field produced by the coil may be reduced.

According to various embodiments, when the at least some lenses are adapted to the specified position, the coil does not form the magnetic field.

According to certain embodiments, the camera module may further include a sensor to measure a position of the magnet. When the position of the magnet is spaced apart from the coil by a distance exceeding a threshold value, the intensity of the magnetic field produced by the coil may be increased.

According to some embodiments, the camera module may further include the vibration sensor. When the vibration sensor may sense a vibration having a value exceeding a threshold value, the intensity of the magnetic field produced by the coil may be increased.

According to various embodiments, the camera module may further include an acceleration sensor. When the acceleration sensor senses an acceleration having a value exceeding a threshold value, the intensity of the magnetic field produced by the coil may be increased.

According to certain embodiments, an intensity of driving force made by the magnetic field produced by the coil may be greater than an intensity of the magnetic force between the magnet and the magnetic substance.

According to some embodiments, a camera module may include a first coil, a second coil disposed to be spaced from the first coil by a first distance, a magnet movable along a specified path having the first distance by a magnetic field produced by the first coil or the second coil, a lens module coupled to the magnet to move together with the magnet, and at least one magnetic substance disposed at outer portions of the first coil and the second coil to bring the magnet into close contact with the first coil or the second coil when the lens module arrives at a specified position.

According to various embodiments, the at least one magnetic substance may extend inward from the outer portions of the first coil and the second coil such that the at least one magnetic substance disposed at the outer portion of the first coil is coupled to the at least one magnetic substance disposed at the outer portion of the second coil. The specified path may include a first section in which the magnet is adapted and a second section in which the magnet is moved. When the magnet may be positioned in the first section, an intensity of magnetic force acting between the magnet and the at least one magnetic substance may be less than an intensity of magnetic force acting between the magnet and the at least one magnetic substance when the magnet is positioned in the second section.

According to certain embodiments, the camera module may further include a non-magnetic substance. The specified path includes a first section in which the magnet is adapted and a second section in which the magnet is moved. The non-magnetic substance may disposed in the second section and couples the at least one magnetic substance disposed outside the first coil to the at least one magnetic substance disposed outside the second coil.

According to some embodiments, when the lens module arrives at the specified position, a magnetic field produced by the first coil or the second coil may be reduced.

According to various embodiments, the camera module may further include a sensor to measure a position of the magnet. When the position of the magnet is spaced apart from at least one of the first coil or the second coil by a distance exceeding a threshold value, an intensity of the magnetic field produced by the first coil or the second coil may be increased.

According to certain embodiments, the camera module may further include a vibration sensor. When vibration sensor may sense a vibration having a value exceeding a threshold value, an intensity of the magnetic field produced by the first coil or the second coil may be increased.

According to some embodiments, the camera module may further include an acceleration sensor. When the acceleration sensor senses an acceleration having a value exceeding a threshold value, an intensity of the magnetic field produced by the first coil or the second coil may be increased.

According to various embodiments, an intensity of driving force made by the magnetic field produced by the first coil or the second coil may be greater than an intensity of magnetic force between the magnet and the magnetic substance.

According to certain embodiments, an electronic device may include a camera module including a first coil, a second coil spaced apart from the first coil by a first distance, a magnet movable along a specified path having the first distance by a magnetic field produced by the first coil or the second coil, a lens module coupled to the magnet to move together with the magnet, and at least one magnetic substance disposed at outer portions of the first coil and the second coil to bring the magnet into close contact with the first coil or the second coil when the lens module arrives at a specified position, and a control circuit to adjust an intensity of a current flowing through the first coil or the second coil.

According to some embodiments, the control circuit may be configured to reduce the intensity of the current flowing through the first coil or the second coil, when the lens module arrives at the specified position.

According to various embodiments, the electronic device may further include a sensor to measure a position of the magnet. The control circuit may increase the intensity of the current flowing through the first coil or the second coil, when the position of the magnet is spaced apart from at least one of the first coil or the second coil by a distance exceeding a threshold value.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to certain embodiments of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 740) including an instruction stored in a machine-readable storage media (e.g., the internal memory 736 or the external memory 738) readable by a machine (e.g., a computer). The machine may be a device that calls the instruction from the machine-readable storage media and operates depending on the called instruction and may include the electronic device (e.g., the electronic device 701). When the instruction is executed by the processor (e.g., the processor 720), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to some embodiments, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A camera module comprising:
   a lens unit including one or more lenses, wherein a lens of the one or more lenses is movable along a path corresponding to optical axes of the one or more lenses; and
   a driving unit to move the lens along the path,
   wherein the driving unit comprises:
      a magnet physically connected with the lens;
      a coil to form a magnetic field such that the magnet moves along the path; and
      a magnetic substance disposed on one surface of the coil opposite to another surface of the coil which is adjacent to the magnet, wherein the magnetic substance is bent and extends in a direction of the path, and
      wherein the magnetic substance positions the lens, which is physically connected with the magnet, to a specified position of the path by using magnetic force between the magnet and the magnetic substance, which is formed as the coil approaches the magnet.

2. The camera module of claim 1, wherein:
   the path includes a first section in which the magnet is positioned and a second section in which the magnet is moved, and
   wherein an intensity of magnetic force acting between the magnet and the magnetic substance in the first section is less than an intensity of a magnetic force acting between the magnet and the magnetic substance in the second section.

3. The camera module of claim 1, further comprising:
   a non-magnetic substance physically connected with the magnetic substance,
   wherein the non-magnetic substance is bent from the magnetic substance and extends in a direction of the path.

4. The camera module of claim 1, wherein, when the lens is positioned to the specified position, an intensity of the magnetic field produced by the coil is reduced.

5. The camera module of claim 4, further comprising:
   a sensor to measure a position of the magnet,
   wherein, when the position of the magnet is spaced apart from the coil by a distance exceeding a threshold value, the intensity of the magnetic field produced by the coil is increased.

6. The camera module of claim 4, further comprising:
   a vibration sensor,
   wherein, when the vibration sensor senses a vibration having a value exceeding a threshold value, the intensity of the magnetic field produced by the coil is increased.

7. The camera module of claim 4, further comprising:
   an acceleration sensor,
   wherein, when the acceleration sensor senses an acceleration having a value exceeding a threshold value, the intensity of the magnetic field produced by the coil is increased.

8. The camera module of claim 1, wherein, when the lens is positioned to the specified position, the coil does not form the magnetic field.

9. The camera module of claim 1, wherein an intensity of driving force made by the magnetic field produced by the coil is greater than an intensity of the magnetic force between the magnet and the magnetic substance.

10. A camera module comprising:
    a first coil;
    a second coil disposed to be spaced from the first coil by a first distance;
    a magnet movable along a specified path having the first distance by a magnetic field produced by the first coil or the second coil;
    a lens module coupled to the magnet to move together with the magnet; and
    at least one magnetic substance disposed at outer portions of the first coil and the second coil to bring the magnet into close contact with the first coil or the second coil when the lens module arrives at a specified position, wherein the magnetic substance is bent and extends in a direction of the specified path.

11. The camera module of claim 10, wherein the at least one magnetic substance extends inward from an outer portion of the first coil and the second coil such that the at least one magnetic substance disposed at the outer portion of the first coil is coupled to the at least one magnetic substance disposed at the outer portion of the second coil,
    wherein the specified path includes a first section in which the magnet is positioned and a second section in which the magnet is moved, and wherein, when the magnet is positioned in the first section, an intensity of magnetic force acting between the magnet and the at least one magnetic substance is less than an intensity of a magnetic force acting between the magnet and the at least one magnetic substance when the magnet is positioned in the second section.

12. The camera module of claim 10, further comprising:
a non-magnetic substance,
wherein the specified path includes a first section in which the magnet is positioned and a second section in which the magnet is moved, and
wherein the non-magnetic substance is disposed in the second section and couples the at least one magnetic substance disposed outside the first coil to the at least one magnetic substance disposed outside the second coil.

13. The camera module of claim 10, wherein, when the lens module arrives at the specified position, a magnetic field produced by the first coil or the second coil is reduced.

14. The camera module of claim 13, further comprising:
a sensor to measure a position of the magnet,
wherein, when the position of the magnet is spaced apart from at least one of the first coil or the second coil by a distance exceeding a threshold value, an intensity of the magnetic field produced by the first coil or the second coil is increased.

15. The camera module of claim 13, further comprising:
a vibration sensor,
wherein, when the vibration sensor senses a vibration having a value exceeding a threshold value, an intensity of the magnetic field produced by the first coil or the second coil is increased.

16. The camera module of claim 13, further comprising:
an acceleration sensor,
wherein, when the acceleration sensor senses an acceleration having a value exceeding a threshold value, an intensity of the magnetic field produced by the first coil or the second coil is increased.

17. The camera module of claim 10, wherein an intensity of a driving force made by the magnetic field produced by the first coil or the second coil is greater than an intensity of magnetic force between the magnet and the magnetic substance.

18. An electronic device comprising:
a camera module including a first coil, a second coil spaced apart from the first coil by a first distance, a magnet movable along a specified path having the first distance by a magnetic field produced by the first coil or the second coil, a lens module coupled to the magnet to move together with the magnet, and at least one magnetic substance disposed at outer portions of the first coil and the second coil to bring the magnet into close contact with the first coil or the second coil when the lens module arrives at a specified position, wherein the magnetic substance is bent and extends in a direction of the specified path; and
a control circuit to adjust an intensity of a current flowing through the first coil or the second coil.

19. The electronic device of claim 18, wherein the control circuit is configured to:
reduce the intensity of the current flowing through the first coil or the second coil, when the lens module arrives at the specified position.

20. The electronic device of claim 19, further comprising:
a sensor to measure a position of the magnet,
wherein the control circuit is configured to:
increase the intensity of the current flowing through the first coil or the second coil, when the position of the magnet is spaced apart from at least one of the first coil or the second coil by a distance exceeding a threshold value.

* * * * *